United States Patent [19]

Hirota et al.

[11] Patent Number: 4,521,323
[45] Date of Patent: Jun. 4, 1985

[54] POLYCRYSTALLINE FERRITE AND A MAGNETIC HEAD USING THE SAME

[75] Inventors: Ken Hirota, Toyonaka; Yoshiaki Fujimoto, Miyazaki; Kouichi Watanabe, Miyazaki; Minoru Sugimura, Miyazaki, all of Japan

[73] Assignee: Matsushita Electric Industrial Co., Ltd., Osaka, Japan

[21] Appl. No.: 625,353

[22] Filed: Jun. 27, 1984

[51] Int. Cl.$^3$ .................. C04B 35/30; C04B 35/38
[52] U.S. Cl. .................. 252/62.59; 252/62.6; 252/62.62; 252/62.63; 360/127
[58] Field of Search ............... 252/62.59, 62.6, 62.62, 252/62.63; 360/127

[56] References Cited

U.S. PATENT DOCUMENTS

| 3,415,751 | 12/1968 | Hirota et al. | 252/62.59 |
| 3,836,472 | 9/1974 | Soejima et al. | 252/62.6 X |
| 3,837,910 | 9/1974 | Van der Laan et al. | 252/62.6 X |
| 4,439,794 | 3/1984 | Shiroishi et al. | 252/62.59 X |

FOREIGN PATENT DOCUMENTS

| 1007497 | 5/1952 | France | 252/62.59 |
| 1222657 | 6/1960 | France | 252/62.59 |
| 56-78428 | 6/1981 | Japan | 252/62.59 |
| 58-45160 | 3/1983 | Japan | 252/62.62 |
| 1071611 | 6/1967 | United Kingdom | 252/62.62 |

Primary Examiner—Jack Cooper
Attorney, Agent, or Firm—Spencer & Frank

[57] ABSTRACT

A polycrystalline ferrite containing Na, Zr and Ca in amounts of 0.01 to 0.5% by weight, 0.005 to 0.5% by weight and 0.01 to 0.5% by weight respectively, in Mn-Zn or Ni-Zn ferrite to thereby enhance the toughness of said ferrite. Said ferrite is suited for a magnetic head with improved mechanical strength and excellent fine workability.

4 Claims, 5 Drawing Figures

POLYCRYSTALLINE FERRITE AND A MAGNETIC HEAD USING THE SAME

FIELD OF THE INVENTION

This invention relates to polycrystalline ferrite, especially such ferrite which is suited for a magnetic head, and a magnetic head using the same.

CONSTITUTION OF PRIOR ART EXAMPLES AND PROBLEMS INVOLVED

Generally, the magnetic material used for a magnetic head is required to have not only the excellent magnetic properties such as high magnetic flux density and high permeability but also enough mechanical toughness to endure fine precision working during the head fabrication. Further, in order to meet the requirement for high-density recording, the magnetic properties such as high permeability and low loss at high frequencies and the diminution of crystal grain size are required corresponding to the reduction of track width as well as the improvement of mechanical strength.

However, the conventional polycrystalline ferrites had a crystal grain size of around 20 μm and therefore could hardly endure superfine precision working.

OBJECT OF THE PRESENT INVENTION

An object of this invention is to provide polycrystalline ferrite which is smaller than the conventional polycrystalline ferrites in crystal grain size, has good superfine workability and high toughness, and can be mass-produced at low cost.

Another object of this invention is to provide polycrystalline ferrite enhanced in toughness to further improve its superfine workability.

Still another object of this invention is to provide a magnetic head in high yield and suited for high-density recording by using said polycrystalline ferrite.

CONSTITUTION OF THE INVENTION

The present invention features incorporation of 0.01 to 0.5% by weight of Na and 0.005 to 0.5% by weight of Zr in Mn-Zn or Ni-Zn ferrite to thereby enhance the toughness of said ferrite. Further incorporation of 0.01 to 0.5% by weight of Ca is also suggested in this invention for achieving even greater toughness of the ferrite.

The present invention also provides a magnetic head with improved mechanical strength and excellent fine workability by using said polycrystalline ferrite.

DESCRIPTION OF PREFERRED EMBODIMENTS

The present invention will be described in detail hereinbelow by way of the preferred embodiments thereof.

EXAMPLE 1

High-purity iron oxide, high-purity manganese carbonate and high-purity zinc oxide, each with a purity of 99.98% or above, were blended so that their final compositional ratio would become 54.5% by mole $Fe_2O_3$, 29.0% by mole MnO and 16.5% by mole ZnO, and this blend was further added with $Na_2CO_3$ and $ZrO_2$ and subjected to ball-milling in a stainless steel pot for 16 hours. The resultantly formed precipitate was dried at 240° C. for 10 hours and the dry powder was added with pure water in a ratio of 15% by weight of the overall amount of the mixture and then granulated by a granulator. After granulation, the granulated powder was molded under a pressure of 300 kg/cm$^2$ to form a powder compact. This molded powder compact was hot pressed in the air at 1,300° C. for 3 hours by applying a pressure of 300 kg/cm$^2$ to obtain a sintered body. A 3 mm×6 mm×3 mm thick block was cut out from said sintered body. After lapping its surface in the usual way for 20 minutes, said block was polished with a paste containing diamond abrasives of 3 μm in diameter and then immersed in phosphoric acid maintained at a temperature of 80° C. for 30 seconds to etch the mirror-polished surface. The crystal grain size was observed by an optical microscope.

Figure 1:
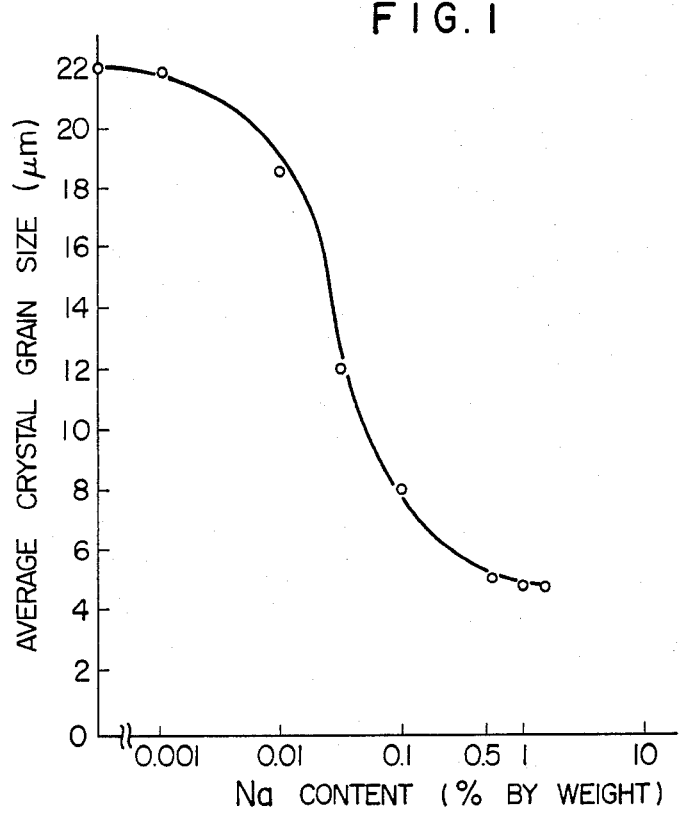
FIG. 1 is a curve showing the relation between Na content and average crystal grain size in an Mn-Zn ferrite.

The relationship between the average grain size of the obtained ferrite crystals and the Na content is graphically shown in FIG. 1. As seen from the graph of FIG. 1, the average grain size of the ferrite crystals reduces when the Na content exceeds 0.01% by weight, but said average grain size becomes substantially constant remaining at 4–5 μm when the Na content becomes greater than 0.5% by weight. However, when the Na content exceeds 0.5% by weight, the magnetic flux density of ferrite decreases and the coercive force of ferrite increases, so that a Na content in excess of 0.5% by weight is undesirable for a magnetic head material.

Therefore, in order to attain the intended reduction of the ferrite crystal grain size while maintaining the magnetic properties of ferrite in the practical range, it is desirable to define the Na content of the composition within the range of 0.01 to 0.5% by weight. By selecting the Na content within this range, it is possible to control the average grain size of ferrite in the range of 5 to 20 μm.

In this case, there was no grain size reducing effect by the addition of Zr nor was there noted any influence of the amount of Zr added on the grain size reducing effect by Na.

By way of comparison, a ferrite specimen was prepared in the same way as described above but without adding $Na_2CO_3$ and $ZrO_2$.

Figure 2:
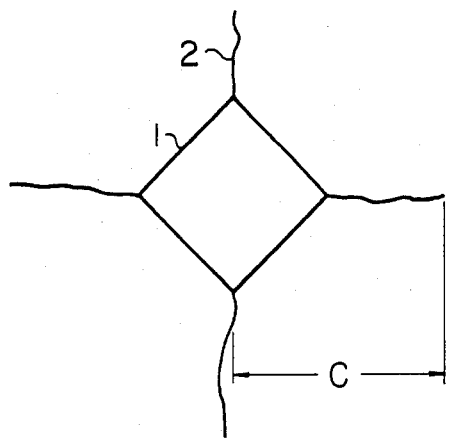
FIG. 2 is a drawing showing the cracks formed by a Vickers indentation.

Both the specimen of Example 1 (with $Na_2CO_3$ and $ZrO_2$) and the comparative specimen (no added $Na_2CO_3$ and $ZrO_2$) were lapped by using $Al_2O_3$ or SiC abrasives in the same manner as when lapping ordinary ceramics and then further polished with diamond abrasive grains of 3 μm in diameter. Each of the thus mirror-polished ferrite specimens was given a Vickers indentation 1 (by applying a load of 200 g for a period of 30 seconds) to produce the cracks 2 as shown in FIG. 2.

The length C of the cracks 2 was measured to determine the relative value of critical stress intensity factor $K_{IC}$ (proportional to $-(3/2)$th power of C). The critical stress intensity factors of the respective compositions, given as relative values to the reference factor (100) where no Na and Zr were added, are shown plotted in FIG. 3. The numerals in the graph of FIG. 3 are the relative values.

Figure 3:
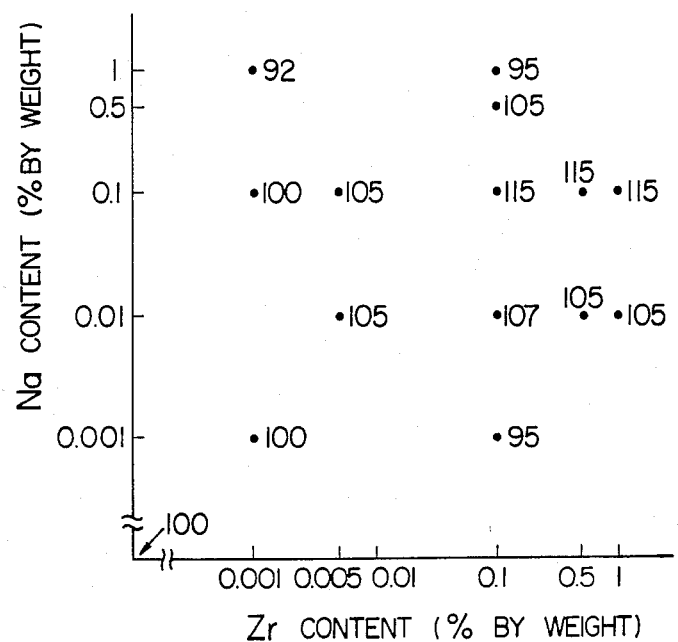
FIG. 3 is a graph showing the relation between Na and Zr contents and critical stress intensity factor.

As can be seen from FIG. 3, no improvement of $K_{IC}$ was provided in case either Na or Zr alone was added, but when the Na content was within the range of 0.01 to 0.5% by weight and the Zr content was within the range of 0.005 to 0.5% by weight, the relative value of $K_{IC}$ became greater than 105, indicating an improvement of toughness and enhanced workability.

However, when the Zr content exceeded 0.5% by weight, the magnetic flux density of ferrite dropped by more than 10% and the coercive force of it increased by more than 10%. Accordingly, the optimum contents of Na and Zr are within the ranges of 0.01 to 0.5% by weight and 0.005 to 0.5% by weight, respectively.

EXAMPLE 2

The same starting materials as used in Example 1 were blended so that the final compositional ratio would be 54.5 mole % $Fe_2O_3$, 29.0 mole % MnO and 165. mole % ZnO, and this blend was added with $Na_2CO_3$ and $ZrO_2$ so that the Na and Zr contents would become 0.01% by weight and 0.005% by weight, respectively, followed by further addition of Ca in various quantities to prepare the various ferrite specimens in otherwise the same way as in Example 1.

Figure 4:
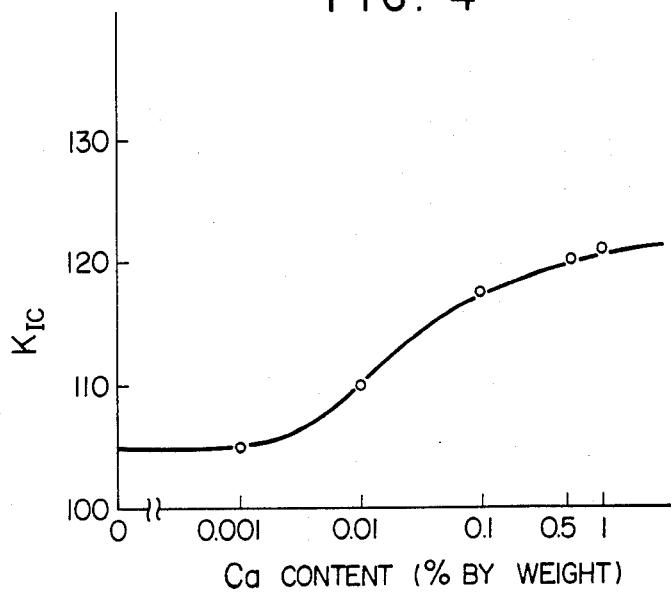
FIG. 4 is a graph showing the relation between Ca content and critical stress intensity factor in an Mn-Zn ferrite where Na content and Zr content are fixed.

FIG. 4 shows the relation between Ca content in the ferrite and critical stress intensity factor $K_{IC}$ (relative value). As seen from the graph of FIG. 4, the critical stress intensity factor increases when the Ca content exceeds 0.01% by weight. When the Ca content was 0.5% by weight, the relative value of $K_{IC}$ reached 120, a value 20% greater than that when the Ca content was zero. When the Ca content was increased to 1% by weight, said relative value was 121, not much different from the value of 120 when the Ca content was 0.5% by weight. Thus, at this level of Ca content, not only the toughness improving effect has reached ceiling but also the magnetic flux density has dropped 10 to 20% while the coercive force of it has become more than doubled as compared to those seen when no Ca was added.

Thus, by containing Ca in an amount of 0.01 to 0.5% by weight in the composition, it is possible to further improve the toughness of the ferrite containing Na and Zr and to obtain a magnetic head material with excellent workability.

EXAMPLE 3

A coprecipitated ferrite was synthesized from the same starting materials as used in Example 1 by a wet process so that the final compositional ratio would be 54.5 mole % $Fe_2O_3$, 29.0 mole % MnO and 16.5 mole % ZnO (said coprecipitated ferrite containing 0.0049% by weight of $SiO_2$, 0.004% by weight of Ca and 0.008% by weight of Na as impurities), and this coprecipitated ferrite was added with $Na_2CO_3$ in an amount of 0.023% by weight based on the total amount of the mixture, then calcinated at 800° C. for 2 hours and ball-milled in a stainless steel pot for 16 hours, and the precipitate was dried at 240° C. for 10 hours. The product was added with pure water in a ratio of 15% by weight and granulated by a granulator. After granulation, the granulated powder was molded under a pressure of 300 kg/cm² and hot pressed in the air at 1,300° C. for 3 hours under pressure application of 300 kg/cm² to obtain a sintered body containing 0.01% by weight of Na. The thus obtained sintered body was polished according to the same procedure as in Example 1 and the average crystal grain size was measured. It was 15 μm.

When said coprecipitated ferrite was treated in the same way as said above by adding 1.16% by weight of $Na_2CO_3$ to prepare a ferrite containing 0.5% by weight of Na, its average crystal grain size was 5 μm.

When a ferrite was prepared according to the same process as described above without adding $Na_2CO_3$ to said coprecipitated ferrite, the average grain size of this ferrite was 20 μm.

When the Na content in the ferrite exceeded 0.5% by weight, there resulted a 15% decrease of the magnetic flux density and a 20% increase of the coercive force.

Another ferrite specimen was prepared by adding $ZrO_2$, in an amount of 0.005–0.5% by weight as calculated in terms of Zr, along with $Na_2CO_3$ to said coprecipitated ferrite. The resultantly obtained polycrystalline ferrite showed a 10–15% increase of critical stress intensity factor as in the case of Example 1. It was thus found that even in the case of using coprecipitated ferrite as the starting material, there is provided the desired effect of reducing the average crystal grain size and improving the toughness of the ferrite.

EXAMPLE 4

High-purity iron oxide, nickel oxide and zinc oxide were blended so that the final compositional ratio would be 51.0 mole % $Fe_2O_3$, 18.8 mole % NiO and 30.2 mole % ZnO, and this blend was added with $Na_2CO_3$ in amounts of 0.023% by weight and 1.16% by weight to prepare two types of material, and each of these two types of material was ball-milled in a stainless steel pot for 16 hours. The precipitate was dried at 240° C. for 10 hours and the dry material was added with pure water in a ratio of 15% by weight and granulated by a granulator. After granulation, the granulated powder was molded under a pressure of 300 kg/cm² and the molded powder compact was treated in the same way as in Example 1. There were thus prepared the ferrite specimens containing 0.01% by weight and 0.5% by weight of NA, respectively. Each of these specimens was immersed in phosphoric acid maintained at a temperature of 130° C. for 5 minutes to etch the mirror-polished surface and the average crystal grain size was measured by an optical microscope. It was found that the average grain size of the former specimen (with 0.01% by weight Na) was 10 μm and that of the latter specimen (with 0.5% by weight Na) was 4 μm.

A sintered body prepared from the same process as said above but without adding $Na_2CO_3$ had an average grain size of 12 μm.

When the Na content has exceeded 0.5% by weight, there resulted a decrease of the magnetic flux density and a corresponding increase of coercive force.

An Ni-Zn ferrite added with 0.005–0.5% by weight of Zr in addition to Na was prepared by using a hot press sintering method. This specimen was reduced in its average crystal grain size in proportion to the Na content and its $K_{IC}$ was improved by about 10 to 15% over the ferrite added with Na alone.

The effect of the addition of Na and Zr on ferrite quality has been discussed above by citing some typical examples of ferrite compositions, but the same tendency was also noted with Mn-Zn and Ni-Zn ferrites of other compositions.

It is desirable that said Mn-Zn and Ni-Zn ferrites containing Na and Zr be improved in toughness especially when they are used for certain specific purposes. Shown below is a typical exemplification of such improvement of toughness according to this invention.

The starting materials were blended so that the final composition would be 51.0 mole % $Fe_2O_3$, 18.8 mole % NiO and 30.2 mole % ZnO, and the blend was added with $Na_2CO_3$, $ZrO_2$ and $CaCO_3$ and treated according to the procedure of Example 2 to prepare a ferrite specimen containing 0.01% by weight of Na, 0.05% by weight of Zr and 0.01% by weight of Ca. The critical stress intensity factor ($K_{IC}$) of this ferrite was 105 expressed as a relative value when said factor of the ferrite not added with Ca was given as 100. Said value was 115 when said factor of the ferrite added with none of Na, Zr and Ca was given as 100.

As viewed above, it is possible to enhance the toughness of Mn-Zn ferrite or Ni-Zn ferrite by containing therein Na and Zr, or Na, Zr and Ca.

A further embodiment of this invention regarding a magnetic head using a polycrystalline ferrite prepared according to this invention will be described below.

EXAMPLE 5

Figure 5:
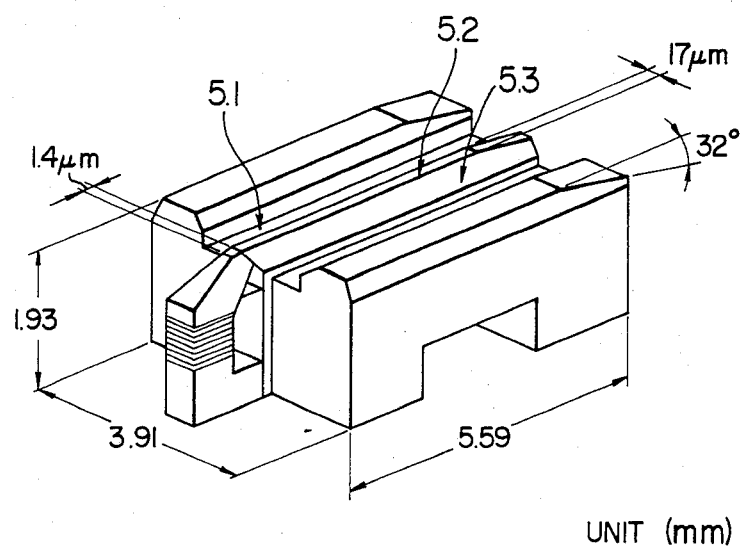
FIG. 5 is a schematic illustration of a Winchester-type magnetic head which is a typical example of magnetic head made by using polycrystalline ferrite according to this invention. In the illustration, reference numeral 5-1 designates a magnetic gap, 5-2 a track portion, and 5-3 a side face of the track.

A magnetic head for a hard disc (so-called "Winchester-type magnetic head") used for magnetic recording with a computer was prepared by using the ferrite added with $Na_2CO_3$, $ZrO_2$ and $CaCO_3$ produced in Example 3 of this invention. FIG. 5 shows a schematic of the core portion of a Winchester-type magnetic head made by using said ferrite according to this invention. In the drawing, reference numeral 5-1 indicates a magnetic gap (gap length: 1.4 $\mu$m), 5-2 a track portion (track width: 17 $\mu$m) and 5-3 a side surface of the track. The Winchester-type magnetic head designed for high-density recording requires high precision working of both gap and track fabrication, and the presence of any "chipping" or "grain-pull-out" in the track portion may cause a misoperation in use of the head, shortening of the head life or damaging to the magnetic disc. In a Winchester-type magnetic head, especially the boundary between the track portion 5-2 and the side face 5-3 tends to incur "chipping" or "grain-pull-out" during head fabrication. In the magnetic heads made by using the ferrite according to this invention, such chipping greater than 3 $\mu$m in size and/or grain-pull-out were seen only in 2 to 3 places or less per head. This is of great significance in comparison with other types of magnetic head. For instance, when the Winchester-type magnetic heads were made by using a polycrystalline ferrite added with none of said compounds ($Na_2CO_3$, $ZrO_2$ and $CaCO_3$) or the one added with $CaCO_3$ alone or the one added with $SiO_2$ and $CaCO_3$ (commonly practiced for improving the magnetic properties at the high frequency), the chipping of greater than 3 $\mu$m in size and grain-pull-out grains have occurred in 20 to 30 places on the average per head, and few of these magnetic heads could stand practical use. When using the ferrite compositions of this invention, including not only the above-said coprecipitated ferrite of Example 3 but also other polycrystalline ferrites shown in Examples 1-4, said chipping and grain-pull-out which could occur in the course of head working are reduced to about 1/10 or less in comparison with the conventional polycrystalline ferrites.

EFFECTS OF THE INVENTION

According to this invention, the average crystal grain size of ferrite can be reduced by containing Na in Mn-Zn or Ni-Zn ferrite, and it is also possible to control the crystal grain size by properly selecting the Na content in the ferrite, allowing obtainment of the optimum crystal grain size according to the working conditions. It is also possible to improve the toughness of ferrite by adding Zr together with Na, and such toughness can be further enhanced by adding Ca in addition to Na and Zr. It is thus possible according to this invention to obtain polycrystalline ferrite with high toughness and excellent workability.

When the ferrite of this invention is used for a magnetic head, the undesirable formation of chipping and grain-pull-out in the course of head fabrication are suppressed to improve the product yield. Further, the magnetic head made according to this invention is minimized in failure rate in operation because grain-pull-out hardly occurs.

What is claimed is:

1. A polycrystalline Mn-Zn or Ni-Zn ferrite containing from 0.01 to 0.5% by weight of Na and from 0.005 to 0.5% by weight of Zr, and exhibiting a higher critical stress intensity factor, $K_{IC}$, than said ferrite absent either Na or Zr.

2. A polycrystalline ferrite as defined in claim 1 further containing from 0.01 to 0.5% by weight of Ca.

3. A magnetic head comprising the polycrystalline ferrite of claim 1.

4. A magnetic head comprising the polycrystalline ferrite of claim 2.

* * * * *